US012032598B2

(12) United States Patent
Addington

(10) Patent No.: US 12,032,598 B2
(45) Date of Patent: Jul. 9, 2024

(54) PERSONAL DATA ASSOCIATION METHOD

(71) Applicant: Christopher Kim Addington, Greensboro, NC (US)

(72) Inventor: Christopher Kim Addington, Greensboro, NC (US)

(73) Assignee: Data Ramp Technologies LLC, Greensboro, NC (US)

(*) Notice: Subject to any disclaimer, the term of this patent is extended or adjusted under 35 U.S.C. 154(b) by 0 days.

(21) Appl. No.: 18/146,780

(22) Filed: Dec. 27, 2022

(65) Prior Publication Data

US 2023/0205790 A1 Jun. 29, 2023

Related U.S. Application Data

(60) Provisional application No. 63/266,023, filed on Dec. 27, 2021.

(51) Int. Cl.
*G06F 16/28* (2019.01)
*G06F 16/14* (2019.01)

(52) U.S. Cl.
CPC .......... *G06F 16/284* (2019.01); *G06F 16/152* (2019.01)

(58) Field of Classification Search
None
See application file for complete search history.

(56) References Cited

U.S. PATENT DOCUMENTS

| | | | |
|---|---|---|---|
| 6,990,238 B1 | 1/2006 | Saffer et al. | |
| 7,539,727 B2 | 5/2009 | Miller et al. | |
| 7,814,169 B2 | 10/2010 | Overton et al. | |
| 7,949,681 B2 | 5/2011 | Bodin et al. | |
| 7,958,131 B2 | 6/2011 | Bodin et al. | |
| 7,974,385 B2 | 7/2011 | Jones et al. | |
| 8,055,650 B2 | 11/2011 | Scanlon et al. | |
| 8,296,342 B2 * | 10/2012 | Stephenson | G06F 16/284 705/52 |
| 8,855,998 B2 | 10/2014 | Gillam et al. | |
| 8,886,589 B2 | 11/2014 | Surendran et al. | |
| 8,977,636 B2 | 3/2015 | Bodin et al. | |
| 9,026,552 B2 | 5/2015 | Jagota | |
| 9,514,183 B1 | 12/2016 | Alla | |
| 9,792,324 B2 | 10/2017 | Drubner | |
| 10,949,451 B2 | 3/2021 | Giuffrida | |
| 2007/0043735 A1 | 2/2007 | Bodin et al. | |
| 2007/0061371 A1 | 3/2007 | Bodin et al. | |
| 2008/0077945 A1 | 3/2008 | Sethuraman | |

(Continued)

*Primary Examiner* — Kim T Nguyen

(74) *Attorney, Agent, or Firm* — Dunlap Bennett & Ludwig, PLLC; Anna L. Kinney

(57) ABSTRACT

A computer-implemented method of identifying an individual independently of the individual's personally identifying information includes providing independent data stores for elements of personal identifying information for a population and fuzzy searching the data stores independently for the elements. Each data store associates each element value and its known variations with a unique static code. The search returns the unique static code associated with each of the elements found and a new independent code is generated if no code is found. The returned 10 codes are concatenated to form a person code. The person codes link information to produce a relationship between disparate data without a master database of people and PII.

10 Claims, 3 Drawing Sheets

(56) References Cited

U.S. PATENT DOCUMENTS

| | | |
|---|---|---|
| 2011/0055166 A1* | 3/2011 | Stephenson ............ G06F 16/284 |
| | | 711/E12.001 |
| 2017/0093700 A1 | 3/2017 | Gilley et al. |
| 2017/0169047 A1 | 6/2017 | Brewer et al. |
| 2023/0061141 A1* | 3/2023 | Michaud ............. H04L 63/0884 |
| 2023/0205790 A1* | 6/2023 | Addington .......... G06F 16/2468 |
| | | 707/705 |

\* cited by examiner

PERSONAL DATA ASSOCIATION METHOD

CROSS-REFERENCE TO RELATED APPLICATION

This application claims the benefit of priority of U.S. provisional application No. 63/266,023, filed Dec. 27, 2021, the contents of which are herein incorporated by reference.

BACKGROUND OF THE INVENTION

The present invention relates to linking personal information on people and locations and, more particularly, to a personal data association method.

Ever-growing and ever-changing sources of information cause certain data on people and locations to remain in a disparate state. Disparate data on people and locations have been linked based on matching disparate data to a master database of people and their personally identifiable information (PII). Linkage of such data requires handling personally identifiable information (PII) and, when processing PII, businesses face the ever-growing ramifications surrounding consumer privacy and security of sensitive information, particularly with systems that utilize a master database. While these systems generally return the desired outcome, the risks and costs to protect PII and comply with emerging consumer privacy regulations is much higher.

As can be seen, there is a need for a means of linking data without storing personally identifiable information.

SUMMARY OF THE INVENTION

In one aspect of the present invention, a computer-implemented method of identifying an individual independently of the individual's personally identifying information comprises providing independent data stores for elements of personal identifying information for a population, each value within the independent data stores, and known variations thereof, being associated with a unique static code; searching each of the independent data stores independently for the elements of the individual's personal identifying information, utilizing a fuzzy search; returning the unique static code associated with each of the elements of the individual's personal identifying information and, for each of the elements having no unique static code, generating a new independent code and returning the new independent code; and concatenating the returned unique static codes and the new independent codes to form a person code.

By assigning universal person codes and location codes to the data, information may be linked to produce a relationship between disparate data. The inventive method eliminates the need for a master database of people and PII. This method treats all available person and location identifiers as independent variables while producing the desired outcome of linking disparate people data without relying on a master reference database of known people and their PII, nor does it store PII.

By embedding the invention in software tools used for business intelligence, analytics, and data preparation, users may gain an improved data readiness state. The problem the invention solves remains prevalent with users tasked with managing and manipulating personal data.

These and other features, aspects and advantages of the present invention will become better understood with reference to the following drawings, description, and claims.

DETAILED DESCRIPTION OF THE INVENTION

Figure 1:
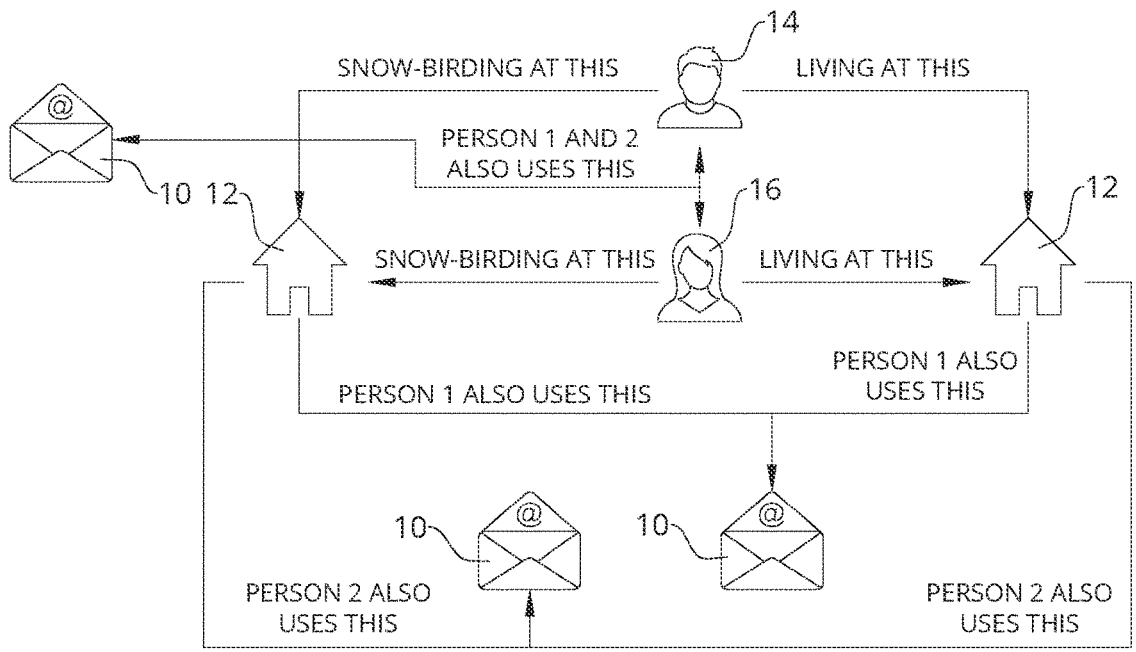
FIG. 1 is a schematic view of a personal data concatenation method according to an embodiment of the present invention.
Figure 2:
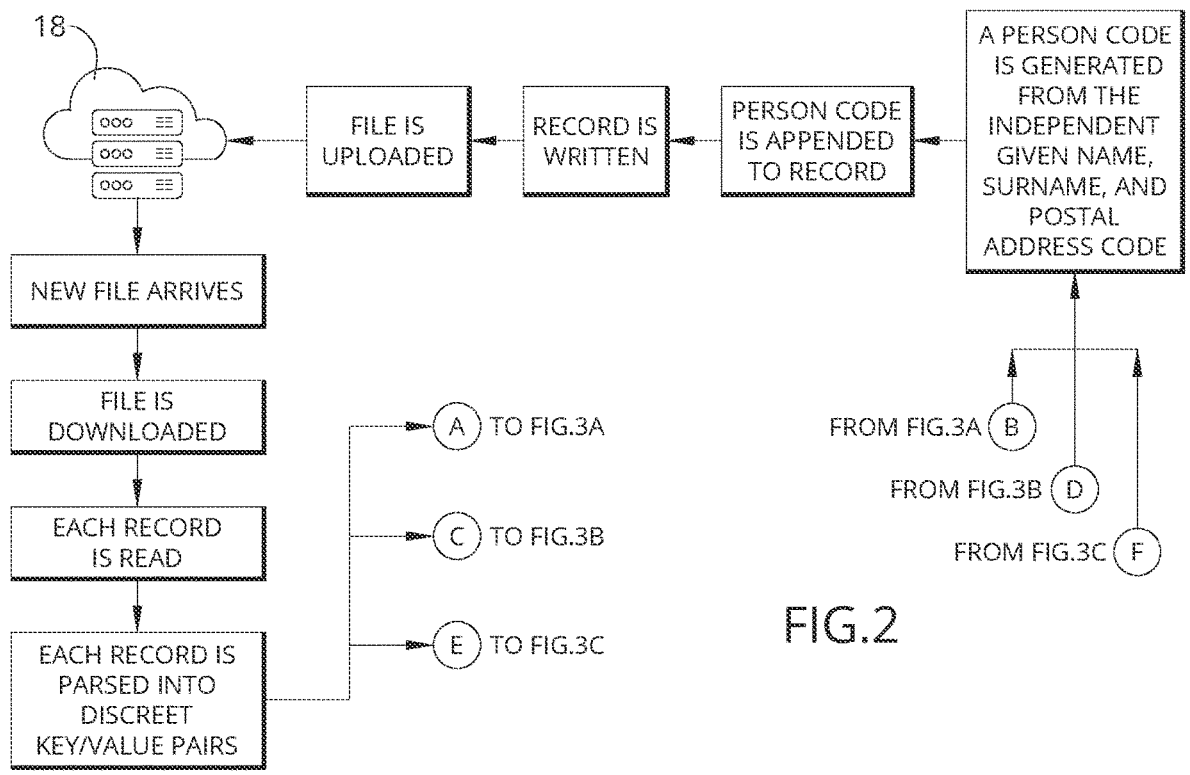
FIG. 2 is a flow chart thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the term "fuzzy search" refers to a search for close matches instead of exact matches.

Broadly, one embodiment of the present invention is a personal data association method comprising (1) an accurate fuzzy search on given names or probable nicknames, surnames, and locations, (2) independent data stores for given names, surnames, and locations to the extent they provide 90%+ coverage when searched, and (3) algorithms for producing a static given name, surname, and location code on each value in each data store while also ensuring various representations of the same value share the same code, e.g., "Jenny, Jen, Jennifer=J4AZ".

When a record of information containing a given name, surname, and location is ingested by the system, each element is processed independently. A given name element is searched in a separate given name list that has no association with a surname element or location element. Likewise, a surname element is searched in a separate surname list that has no association with a given name element or location element. Lastly, a location element is searched in a separate location list that has no association with a given name element or surname element. For any of the elements, if a lookup is successful, an independent code for the element is returned as a response to the lookup. If a lookup is unsuccessful, a new independent code is generated and returned as a response to the lookup. For example, a referential database of given names is searched and if a given name is found, a given name ID is returned. If the name is not found, a new given name ID is generated and returned while the given name referential database is updated. A referential database of surnames is searched and if a surname is found, a surname ID is returned. If the name is not found, a new surname ID is generated and returned while the surname referential database is updated. A referential database of U.S. postal addresses is searched and if a postal address is found, a postal address ID is returned. If the address is not found, there is no further action regarding U.S. postal addresses.

Once each of the independent processes have all completed, the given name code, surname code, and location code are concatenated to produce and return a person code as response to the lookup. Further, the surname code and location code are concatenated to produce and return a family code as a response to the lookup.

Given Name Lookup and Given Name Code Assignment; Surname Lookup and Surname Code Assignment; and Postal Address Lookup and Postal Address Code Assignment are independent functions and may be executed in parallel. Person and Family Code Assignment is dependent on the code assignments for Given Name, Surname, and Postal Address Code.

As new codes are introduced for each new element and stored independently without association for one another, various combinations of the codes may be concatenated to form new ways to link additional disparate data to a person and location.

The roadmap for this method may include the independent lookup of the hash values of email address, phone numbers, or other digital identifiers whereby these additional functional components further enhance the ability to link disparate data to people and locations while not associating these elements to each another.

A system implementing the inventive method may be embedded in a data preparation service that is deployed as a software service (Saas) in the cloud. The method inherits an "ease of use" characteristic of the parent service and includes the following steps.
  (1) Provisioning an AWS® S3 or Azure@ Blob Storage Account.
  (2) Registering the storage account, with access credentials, with the data preparation service that includes the method enabling the data preparation service to monitor this storage account for newly arriving files.
  (3) When an end user copies a file to the registered storage account, the service implementing the method begins reading the contents of the input file, processing the information, and writing the information back to the registered storage account.

Generally, a system implementing the inventive method may be activated for an end user within 24 hours.

A system executing the inventive method reads from a file (input) and writes to a separate file (output). The filenames are provided via arguments accepted by the system. When an input file containing records of a given name, surname, and location is submitted to the system, it processes each element of a record independently. Once each of the independent processes on the record has completed, a person code, a family code, and a location code are appended to the record and written to the output file.

The process may utilize data including (a) a compilation of potentially all given names and surnames as recorded through birth records and (b) a compilation of potentially all U.S. postal addresses. The inventive method fuzzy matches given names, surnames, and postal addresses to pre-assign independent identifiers, and does not rely on a master referential database containing known people with pre-associated personally identifiable components.

Referring to FIGS. 1 through 4, FIG. 1 illustrates an exemplary use of the present invention. A first person 14 may live at a first address 12 and winter at a second address 12 (i.e., snow-birding) with a second person 16. The two persons 14, 16 may share a first email address 10 and may also each independently have another email address 10. The method disclosed herein enables association of these data without personally identifying the first and second persons 14, 16.

Figure 3A:
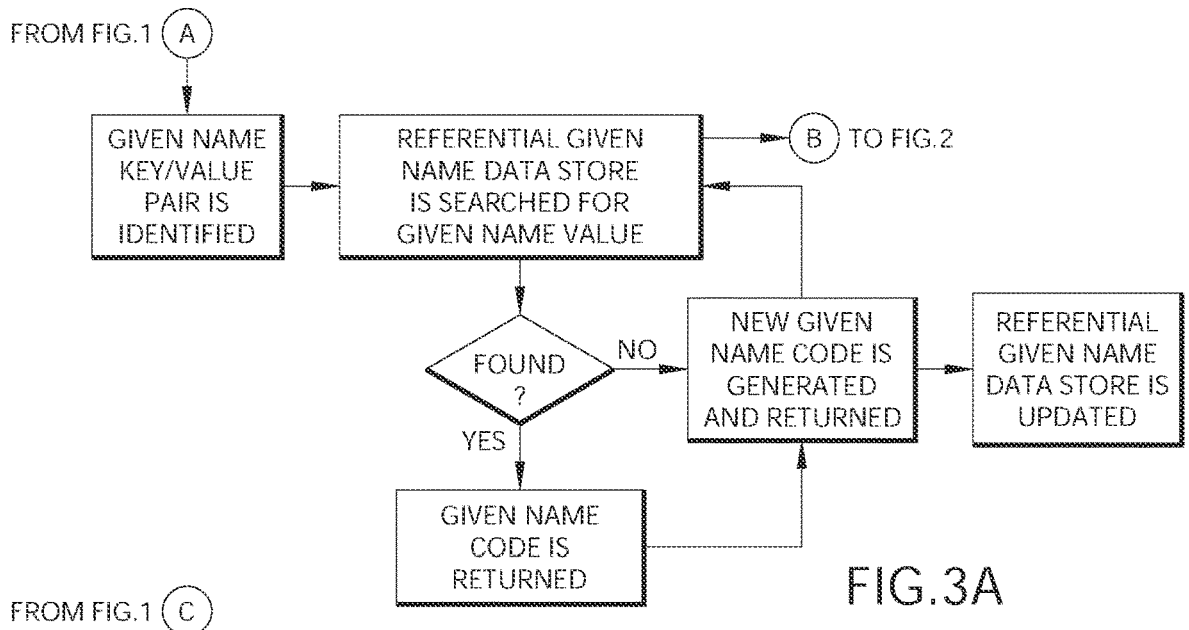
FIG. 3A is a continuation of the flow chart of FIG. 2.
Figure 3B:
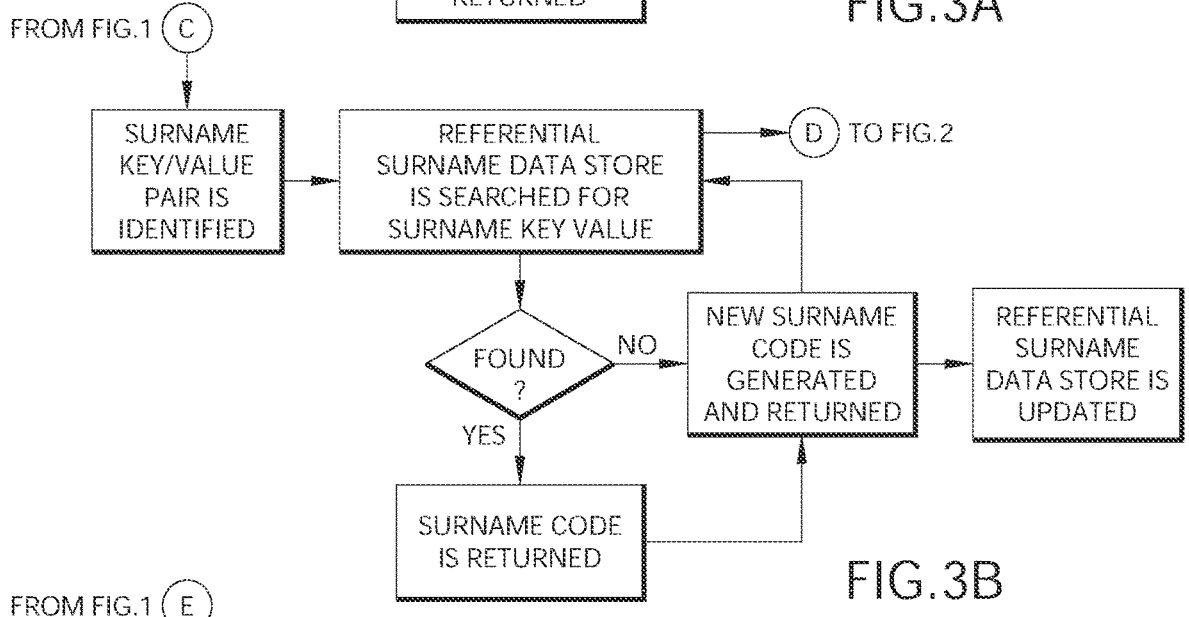
FIG. 3B is a continuation of the flow chart of FIG. 2.
Figure 3C:
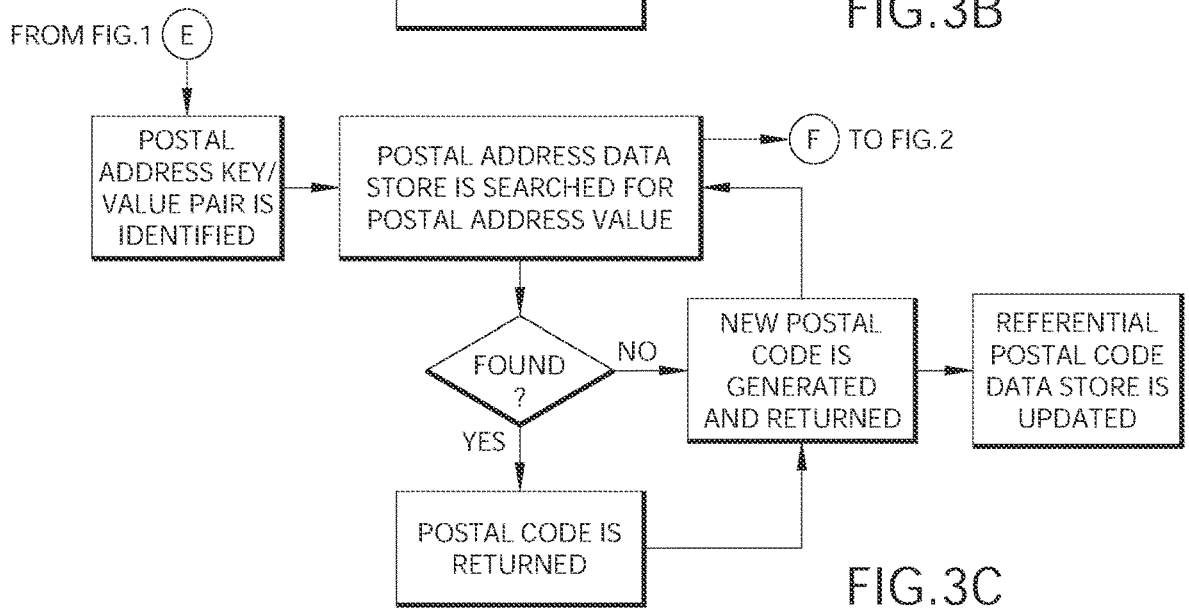
FIG. 3C is a continuation of the flow chart of FIG. 2.

FIGS. 2, 3A, 3B, and 3C are components of a flowchart illustrating a method of linking information about people without using personally identifiable information according to an embodiment of the present invention. As shown in the flowchart, a user copies a file to a registered cloud storage account 18. A service reads the contents of the input file and parses incoming records into discreet key/value pairs. As described in FIG. 3A, a given name key/value pair is identified and a reference data store is searched for the given name. If the name is found, the reference data store returns an associated code. If the name is not found, a new given name code is generated, and the reference data store is updated. The process is repeated for the surname as shown in FIG. 3B. Finally, the process is repeated for the postal address. Given Name Lookup and Given Name Code Assignment; Surname Lookup and Surname Code Assignment; and Postal Address Lookup and Postal Address Code Assignment are independent functions.

Returning to FIG. 2, a Person Code is generated that is dependent on the code assignments for Given Name, Surname, and Postal Address Code. The result is written and uploaded back to the registered storage account 18.

Figure 4:
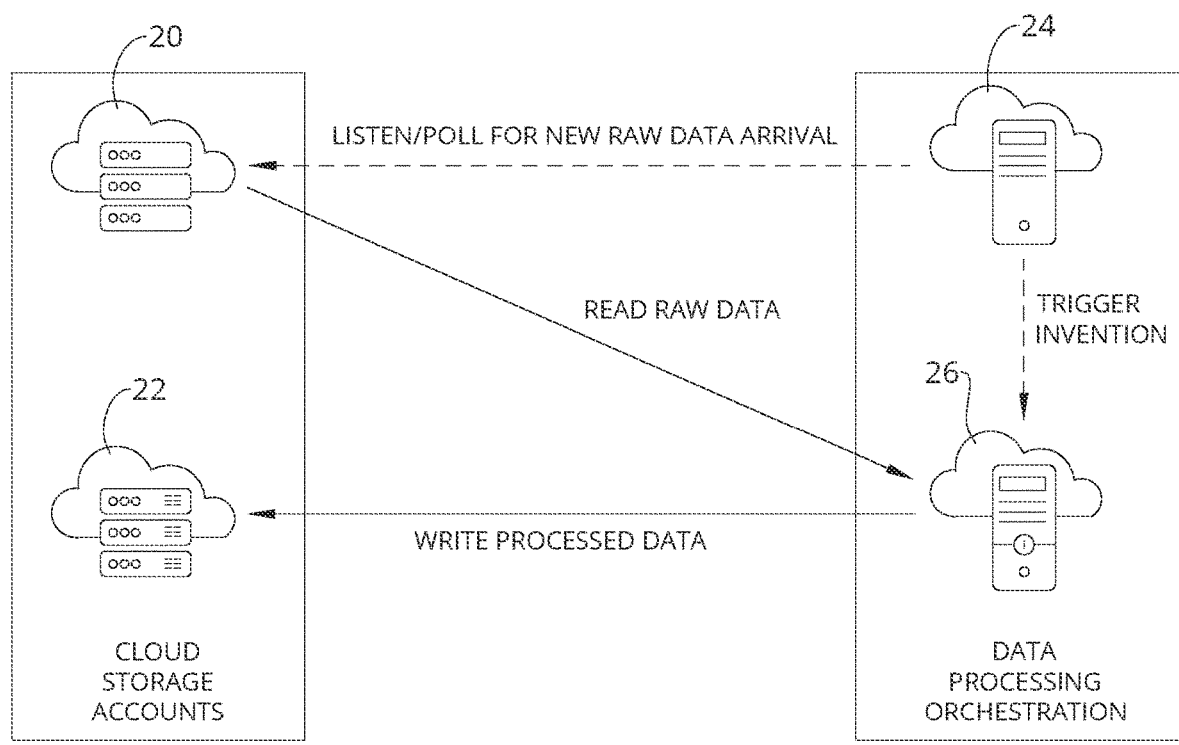
FIG. 4 is a schematic view of system architecture according to an embodiment of the present invention.

FIG. 4 illustrates architecture for a system according to an embodiment of the present invention, comprising cloud storage accounts for raw data 20 and curated data 22, and processors operating a listener virtual machine 24 and a data processing virtual machine 26. The listener processor 24 monitors raw data stored to the raw data storage account 20, and the data processing processor 26 reads the raw data and writes processed data to the curated data account 22.

It should be understood, of course, that the foregoing relates to exemplary embodiments of the invention and that modifications may be made without departing from the spirit and scope of the invention as set forth in the following claims.

What is claimed is:

1. A computer-implemented method of identifying an individual independently of the individual's personally identifying information, comprising:
  (a) providing independent data stores for elements of personal identifying information for a population, each value within the independent data stores, and known variations thereof, being associated with a unique static code;
  (b) providing an input file containing one or more of the elements of the individual's personally identifying information;
  (c) searching, by a processor, each of the independent data stores independently for the elements of the individual's personal identifying information from the input file, utilizing a fuzzy search;
  (d) returning, by the processor, the unique static code associated with each of the elements of the individual's personal identifying information and, for each of the elements having no unique static code, generating, by the processor, a new independent code and returning, by the processor, the new independent code;
  (e) concatenating, by the processor, the returned unique static codes and the new independent codes to form a person code; and
  (f) writing the person code to an output file.

2. The computer-implemented method of claim 1, wherein the elements include given names and associated nicknames.

3. The computer-implemented method of claim 1, wherein the elements include surnames.

4. The computer-implemented method of claim 1, wherein the elements include locations.

5. The computer-implemented method of claim 3, wherein the elements further include locations, further comprising:
concatenating the returned unique static codes for the surname and the location to produce a family code.

6. The computer-implemented method of claim 1, wherein the elements further comprise at least one parameter selected from the group consisting of: email address, phone numbers, digital identifiers; and wherein the unique status codes are hash values.

7. The computer-implemented method of claim 1, further comprising:
provisioning a data storage account containing the independent data stores;
registering the data storage account with a data preparation service operative to monitor the storage account for changes and to engage the processor upon receipt of a file to read the file;
receiving a file containing at least one of the elements to the data storage account; and, prior to the step of searching,
identifying the elements with the processor.

8. The computer-implemented method of claim 7, further comprising, after the step of concatenating:
saving the person code to an output file on the data storage account.

9. A system comprising: a data storage account storing raw element data; a data storage account storing curated data; a data preparation service; a processor; and one or more computer storage media having processor-executable instructions embodied thereon that when executed, perform the computer-implemented method of claim 1.

10. A non-transitory computer-readable medium containing one or more sequences of instructions executable by a processor in a computer to perform the computer-implemented method of claim 1.

* * * * *